Nov. 4, 1952     A. K. LYLE     2,616,124
MECHANISM FOR MANUFACTURING SMALL GLASS BEADS
Filed May 13, 1950     2 SHEETS—SHEET 2

INVENTOR
AARON K. LYLE
BY Parham & Bates
ATTORNEYS

Patented Nov. 4, 1952

2,616,124

UNITED STATES PATENT OFFICE 2,616,124

MECHANISM FOR MANUFACTURING SMALL GLASS BEADS

Aaron K. Lyle, West Hartford, Conn., assignor to Emhart Manufacturing Company, a corporation of Delaware Application May 13, 1950, Serial No. 161,810

2 Claims. (Cl. 18—2.6)

This invention relates to improvements in mechanisms for manufacturing small glass beads such as are used extensively to form reflecting surfaces on traffic signs, highway traffic lines, vehicle license plates, advertising signs, etc.

The current method of producing such small glass beads is to crush glass to a desired range of grain sizes, screen the crushed glass to eliminate unduly coarse and fine particles, and finally to round the retained grains while they are suspended in a flame.

This method of producing glass beads obviously is costly and inefficient because of waste of glass, multiplicity of successive operations and time required, handling charges, etc. Moreover, the individual beads vary among themselves in size.

A general object of the present invention is to obviate the above and other shortcomings of this prior art method.

A more specific object of the present invention is to produce glass beads of nearly uniform diameter from molten glass in a single operation and by the use of a simple form of mechanism.

I propose for this purpose a molten glass containing horizontally disposed stalagmometer having a multiplicity of radial capillaries, each having a well defined outer end or tip, the stalagmometer operating in a heated atmosphere of nearly uniform temperature and being rotated about its vertical axis so that molten glass issuing from the capillaries will be thrown from the tips thereof in the form of small beads of nearly uniform size. The stalagmometer-container may be provided with capillaries sufficient in number to make the total output of beads relatively high. Rotation of the container increases the force effective on each bead as formed at the outer end of a capillary and thus decreases the bead size and increases the rate of production of beads per capillary. Substantial uniformity of temperature of glass entering the capillaries and at their tips assures formation and throwing off of beads rather than fibers or fibers with beads at their leading ends.

Other objects and advantages of the invention hereinafter will be pointed out or will become apparent from the following description of a practical embodiment thereof, as shown in the accompanying drawings, in which.

Figure 1:
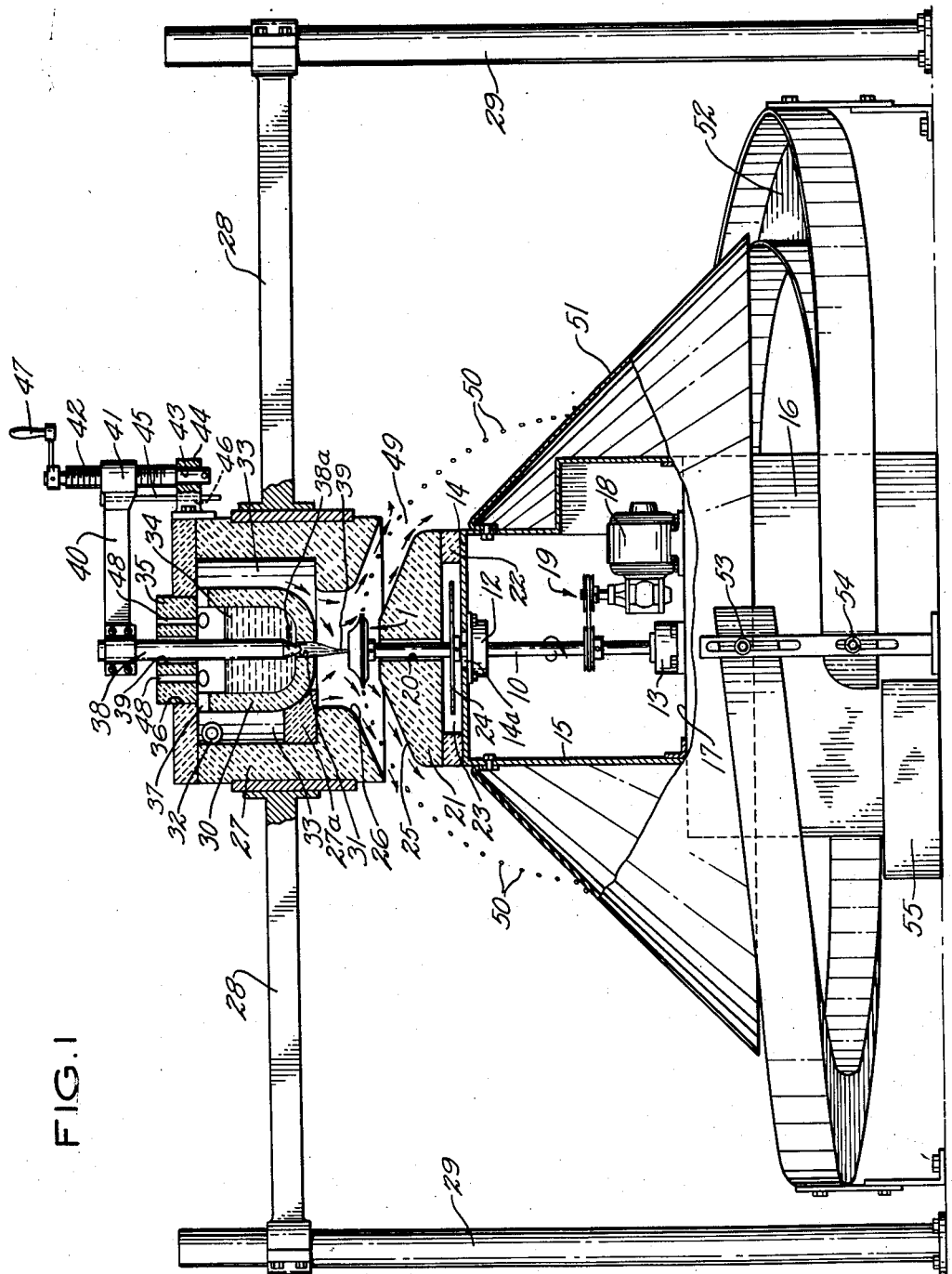
Figure 1 is a view, mainly in elevation, of a glass bead producing mechanism of the invention, parts thereof being shown in vertical section.

Referring now to the drawings, a rotary stalagmometer-container made of a heat resistant material so as to be adapted to contain molten glass is generally designated 1. It may be formed to comprise a substantially flat bottom 2, Fig. 4, provided with an integral upwardly and inwardly inclined or generally frusto-conical side wall 3, Figs. 3 and 4. The chamber thus defined within the container 1 is designated 4, Fig. 4, and is of greatest area at its bottom and of decreasing area toward its top, which is open at 5, Figs. 3 and 4. A container having a side wall of this shape is preferred because of its glass retaining and directing features when the container is rotated rapidly about its vertical axis while molten glass is being supplied thereto as hereinafter explained. However, containers having side walls of cylindrical or other known shapes may be used.

Figure 3:
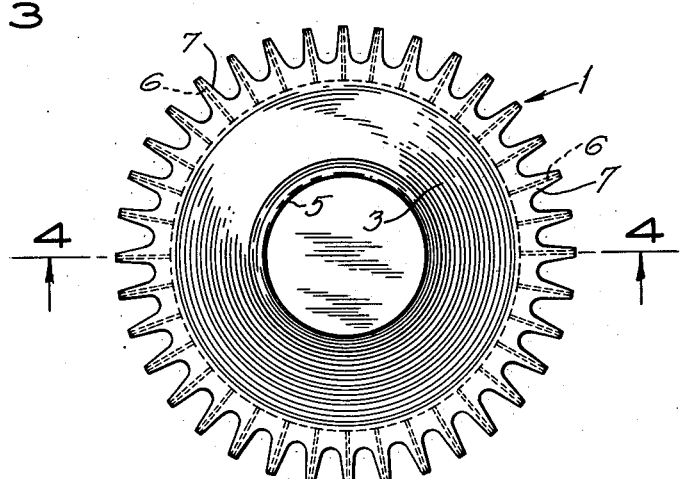
Fig. 3 is a further enlarged top plan view of the stalagmometer-container alone.
Figure 4:
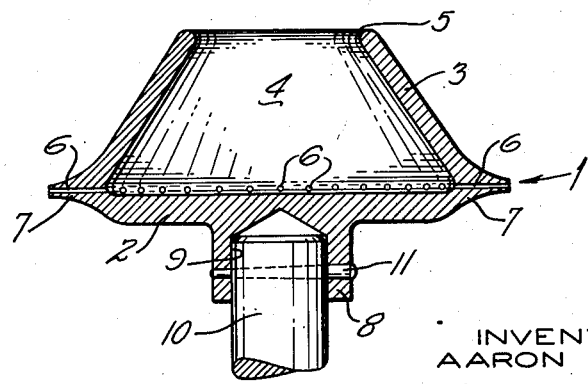
Fig. 4 is a section through such container substantially along the line 4—4 of Fig. 3, with a portion of its supporting rotary shaft also shown.

The container 1 is provided with a multiplicity of angularly spaced radial capillaries, each comprising a small radial passage 6 extending at the bottom of the chamber 4 through the container side wall proper and through a pointed outward projection 7 thereon as shown in Figs. 3 and 4 so that each capillary terminates in a well defined tip on which issuing glass will form a small rounded drop or bead which will be severed cleanly therefrom when formed.

The container 1 may be supported in a horizontal position for rotation about its vertical axis in any suitable known way. In the example shown, the bottom 2 of the container 1 has a central depending boss 8 provided with a central partial bore or socket 9 fitting over the upper end of a vertical shaft 10 and fastened thereto by a pin 11. The shaft 10 is journaled for rotation about its axis in suitable fixed-position bearings 12 and 13, Fig. 1. In the particular structure shown, the bearing 12 is carried by the top 14 of a box-like housing 15 mounted on a base 16, the top of which, indicated at 17, carries the bearing 13. A motor 18 in the housing 15 drives the shaft 10 through suitable motion transmitting connections, generally indicated at 19, so as to rotate the vertical shaft 10 about its axis, as in a clockwise direction as indicated by the direction arrow in Fig. 1. The drive shaft 10 projects above the bearing 12 through an opening 14a in the housing top wall 14 and through a vertical opening 20 in a circular refractory block 21 which is supported above the top 14 of the housing by a supporting ring 22. This provides space between the top of the housing and the block 21, as indicated at 23, in which a heat shield or baffle 24 on the rotary shaft 10 may be located. The container 1 on the upper end of shaft 10 is supported above the central portion of the refractory block 21 which has a sloping top wall 25 extending a substantial distance outward beyond the periphery of the container 1. It, of course, will be understood that various other known types of supporting structures may be provided rotatably to support the drive shaft 10 with the container thereon in a desired location.

Figure 2:
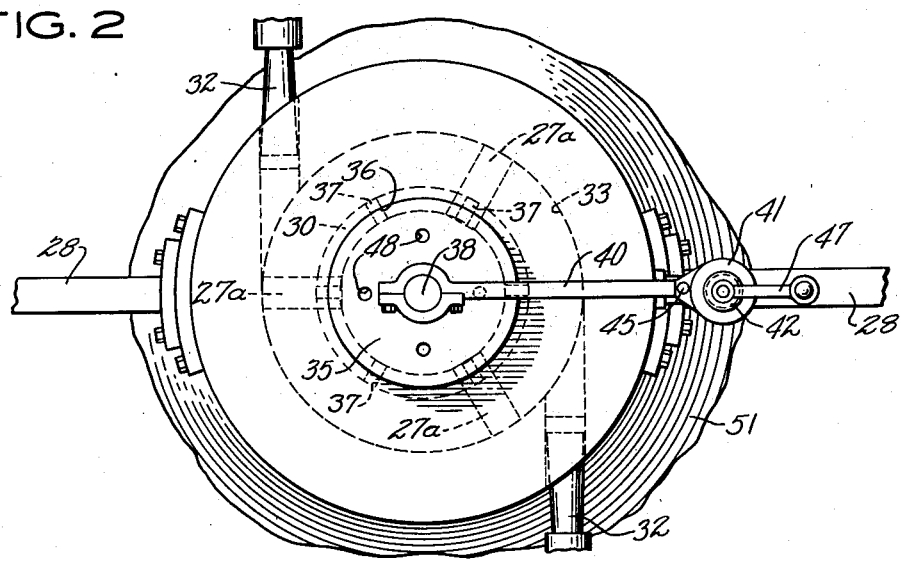
Fig. 2 is a partial top plan view of the mechanism, the view being relatively enlarged.

The container 1, supported as described, is located within a downwardly flaring large central opening 26 in the bottom of a refractory-walled heating chamber 27 which is carried by a supporting framework comprising horizontal supporting arms 28 and upright standards 29. Within the heating chamber 27 is a refractory container 30 having a discharge opening 31 at its bottom above and in line with the opening in the top of the container 1. The container 30 is supported within the heating chamber 27 by refractory supporting blocks 27a or other suitable known means so as to be spaced from the walls of the heating chamber. Heat from a suitable heating means, as from burners indicated at 32, Figs. 1 and 2, will fill the space indicated 33 around the container 30 so as to heat the latter and a body of molten glass 34 therein to the desired temperature and viscosity. The container 30 is provided with a top 35 fitting in a suitable opening 36 in the top of the heating chamber 27. Heat from the space 33 may pass into the interior of the container 30 through openings 37 in the container side wall beneath the container top 35.

A vertically adjustable refractory valve 38 depends through a central opening 39 in the container top 35 and is adjusted until its tapered lower end or tip 38a occupies the desired position in relation to the bottom discharge opening 31 to permit flow of glass in a suitable stream 39 from the glass supply container 30 downwardly into the glass discharge container 1. The glass flow regulating valve 38 is adjustably supported by an overhanging arm 40 having an outer end portion 41 threadedly engaged with a vertical adjusting screw 42 which has its lower end portion rotatably mounted at 43 in a bracket 44 on the heating chamber 27. A guide pin 45 depends from the supporting arm 41 through a vertical opening 46 in the bracket 44 to maintain the arm 40 in proper overhanging relation to the container 1 when the screw 42 is rotated, as by a handle 47, to adjust the glass flow regulating valve 38 vertically in relation to the opening 31 in the bottom of the supply container 30.

The top 35 of the supply container 30 may be provided with vents as indicated at 48 to allow exhaust of some gases and heat from the space above the glass 34 in the container 30. This supply of glass may be maintained or renewed in any suitable known manner, as by pouring thereinto molten glass from a producing source or by melting glass cullet, glass marbles or other glass particles therein.

Heat from the heating space 33 in the heating chamber 27 will pass downwardly around the bottom of supply container 30 through the opening 26 as indicated by the direction arrows so as completely to envelop the container 1 and to fill the annular space 49 extending downwardly and outwardly between the wall of the flaring bottom portion of opening 26 and the underlying sloping surface 25 of the refractory block 21. A substantially uniformly heated environment thus will be provided for the glass supply stream 39, the rotating container 1 and the glass therein, and the glass issuing from the capillaries of the container 1 and thrown off therefrom as beads 50. See Fig. 1.

In the example shown in the drawings, the stalagmometer-container has only one circular series of glass bead forming capillary passages 7. Output may be increased by providing several such series at different levels in the rotating stalagmometer-container. The beads 50 produced by the rotation of the container 1 will be thrown through the annular passageway 49, Fig. 1. A frusto-conical bead conducting member 51 may be provided around the housing 15 to receive the falling beads and to conduct them downwardly into a spiral trough 52 located at the bottom of the member 51. The spiral trough 52 may have its opposite ends secured in individually vertically adjusted positions by fastening means indicated at 53 and 54, respectively, Fig. 1, so that the slope of the trough from its higher to its lower end will be sufficient to cause beads falling into the trough to slide or roll therein to and from the lower end of the trough into a suitable receptacle 55.

By a mechanism such as herein described, beads of nearly uniform size may be produced at a low cost since only one operation is required and the mechanism when supplied with molten glass acts automatically and without waste of time or material.

Dense barium crown and lime glasses are well adapted to be formed into small glass beads by mechanism of the invention substantially as herein described. Other glasses may of course be used with satisfactory results.

For clarity of illustration, the stalagmometer-container of the illustrative embodiment of the invention has been shown with only a comparatively few capillaries. The output to be obtained may be predetermined by selection of the size of the stalagmometer-container, the number of its capillaries, its speed of rotation, the temperature and viscosity of the glass used, etc. Simply by way of example and not as a limitation on any of these, the stalagmometer-container may have an outside diameter of 10 cms. (approximately 4 inches), and be formed with 200 capillaries, each having a length of 0.2 cm. and a diameter of 0.15 cm. With a speed of rotation of 600 R. P. M. and using glass having a viscosity of 100 poises and a surface tension of 300 dynes per cm. and a density of 2.5 g./cc., the volume of glass supplied per capillary per day would be approximately 1090 cubic cms. This is equivalent to 2700 grams, or for 200 capillaries approximately 540 kg. per day. The estimated size of the drops or beads produced would be in the order of 0.0035 cu. cm. or 0.0088 gm., each drop or bead being in the form of a sphere having an estimated diameter of 0.198 cm. On the basis of the glass supplied and the drop size, the rate of bead formation would be 216 beads per minute per capillary or a total of 43,200 beads per minute for the machine of 200 capillaries.

By making the rotating stalagmometer-container 15 cm. (approximately 6 inches) outer diameter, the forces will be increased about fifty per cent. The number of capillaries of such a container may be increased about forty per cent so that the total output of the machine then would be nearly 1000 kgs. per day. Under these conditions, the bead size would be decreased to approximately 0.16 cm. diameter.

I claim:

1. Mechanism for producing small glass beads comprising a heating chamber having a bottom formed with a heating opening therein, an open-top stalagmometer-container for molten glass of circular cross-sectional configuration and formed with a multiplicity of radial glass discharge capillaries spaced angularly around its lower portion and each terminating in a projecting tip, said stalagmometer-container being considerably smaller in diameter than the heating opening in the bottom of the heating chamber, means mounting the stalagmometer-container in said heating opening in a horizontal position in spaced relation to the wall of the opening and for rotation about its vertical axis, means located within the heating chamber to feed molten glass in a stream descending in said heating opening into the stalagmometer-container, means to rotate the stalagmometer-container about its vertical axis to cause issuance of glass therefrom through said capillaries, and means to heat said heating chamber and its bottom heating opening above and around the rotating stalagmometer-container to maintain the glass issuing from the tips of the capillaries at as high a temperature and as fluid as said glass in said capillaries, whereby the issuing glass will form and be cast off the tips as successive small beads.

2. Mechanism as defined by claim 1 wherein said heating opening is formed with a downwardly flaring lower portion surrounding the stalagmometer-container, and, in addition, a circular refractory block having a top wall sloping outward from its central portion is positioned directly below the stalagmometer-container in line with the heating opening and in adjacent spaced relation to the wall of the downwardly flaring portion of the heating opening to co-operate therewith to define a downwardly inclined annular heated passage around the stalagmometer-container.

AARON K. LYLE.

REFERENCES CITED

The following references are of record in the file of this patent:

UNITED STATES PATENTS

| Number | Name | Date |
|---|---|---|
| Re. 12,568 | Cowing | Nov. 27, 1906 |
| 2,061,696 | DeBats | Nov. 24, 1936 |
| 2,192,944 | Thomas | Mar. 12, 1940 |
| 2,217,235 | Rieser | Oct. 8, 1940 |
| 2,431,205 | Slayter | Nov. 18, 1947 |

FOREIGN PATENTS

| Number | Country | Date |
|---|---|---|
| 497,586 | Great Britain | Dec. 19, 1938 |